No. 650,619. Patented May 29, 1900.
J. SCHWARZ.
TOY.
(Application filed Nov. 24, 1899.)
(No Model.)
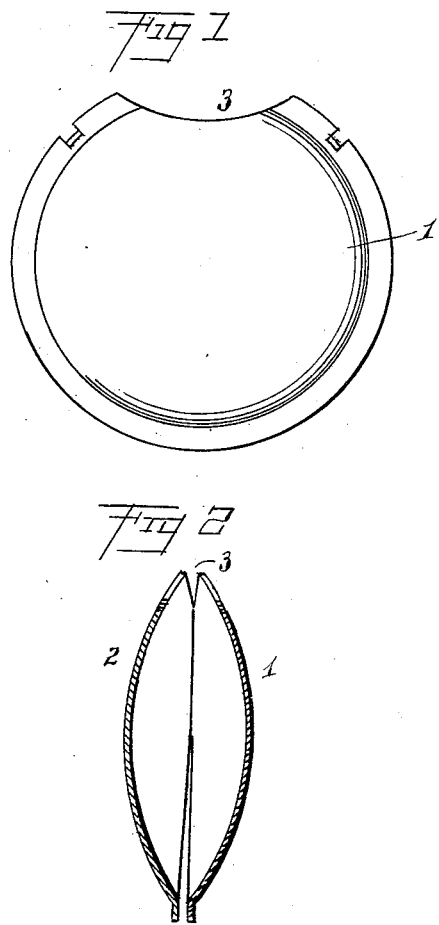
WITNESSES:
Joseph Schwarz,
INVENTOR
BY
Emanuel Nertz
ATTORNEY
THE NORRIS PETERS CO., PHOTO-LITHO., WASHINGTON, D. C.

UNITED STATES PATENT OFFICE.

JOSEPH SCHWARZ, OF NEW YORK, N. Y.

TOY.

SPECIFICATION forming part of Letters Patent No. 650,619, dated May 29, 1900.

Application filed November 24, 1899. Serial No. 738,163. (No model.)

*To all whom it may concern:*

Be it known that I, JOSEPH SCHWARZ, a citizen of the United States, and a resident of the city of New York, in the county and State of New York, have invented a new and useful Improvement in Toys, of which the following is a specification.

This invention relates to musical instruments in the class of toys; and the object is to provide a simple device by means of which a person without knowledge of music or of the manipulation of a musical instrument may play tunes with tones simulating that of a cornet or any such similar instrument.

I will describe my invention and then point out the novel features in the appended claims.

In the drawings, Figure 1 is a side view of an instrument embodying my invention, and Fig. 2 is a sectional view thereof.

The device comprises two concavo-convex disks 1 2 of metal or other suitable material capable of vibration. These disks are secured and held together near the top, with their concave sides inward or opposing, and below the fastening-points they are left free or unconnected one with the other. At the top sections are cut out, forming a mouthpiece 3, as plainly shown in the drawings.

In using the instrument a person is to place his mouth over the mouthpiece of the instrument, and then by intonations of the voice the tones and vibrations thereof will be reproduced and augmented in volume by the disks in such manner as to simulate the tones of a cornet or similar instrument, it being understood that varying pressure with the fingers may be brought to bear on the disks.

Having described my invention, what I claim is—

1. A musical toy comprising two concave disks secured together near the top and free and unfastened below the two connecting-points and having an opening or mouthpiece between and above the fastening-points.

2. A musical toy comprising two concave disks of vibratory material secured together near the top and free one from the other below said securing-points and each having a cut-away portion forming a mouthpiece, the parts also being unconnected above the said fastening-points.

Signed at the city of New York, N. Y., this 23d day of November, 1899.

JOSEPH SCHWARZ.

In presence of—
ABRAHAM WIELOR,
HENRY LESSER.